(No Model.)
R. M. HERMANCE.
STOVE DAMPER.
No. 371,456. Patented Oct. 11, 1887.
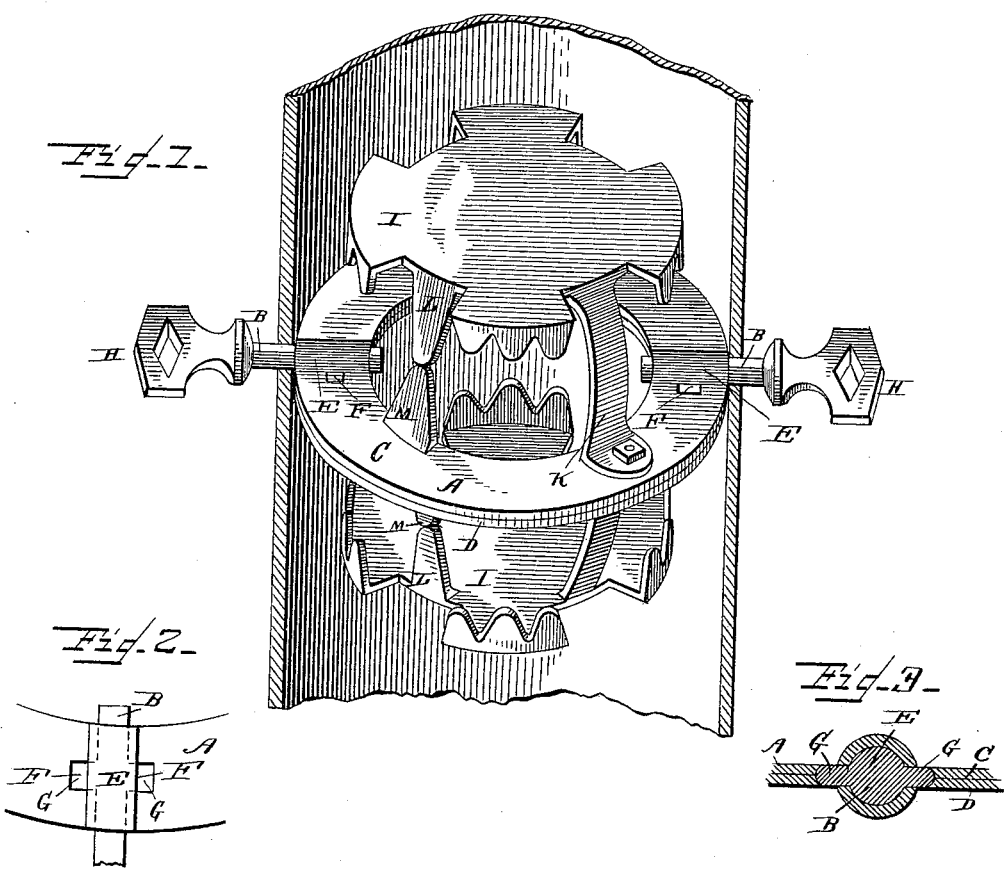
WITNESSES
Edwin L. Yewell,
C. D. Davis
INVENTOR
Richard M. Hermance
By C. M. Alexander,
Attorney

UNITED STATES PATENT OFFICE.

RICHARD M. HERMANCE, OF POUGHKEEPSIE, NEW YORK.

STOVE-DAMPER.

SPECIFICATION forming part of Letters Patent No. 371,456, dated October 11, 1887.

Application filed April 13, 1887. Serial No. 234,601. (No model.)

*To all whom it may concern:*

Be it known that I, RICHARD M. HERMANCE, a citizen of the United States, residing at Poughkeepsie, in the county of Dutchess and State of New York, have invented certain new and useful Improvements in Stove Dampers, of which the following is a specification, reference being had therein to the accompanying drawings.

This invention relates to that class of dampers which retard, but do not prevent, the flow through a pipe or flue; and it has for its object to facilitate and cheapen the manufacture of the damper, as well as improve its operation.

To this end the invention consists in certain novel features of construction, which will be fully understood from the following description when taken in connection with the annexed drawings.

In the drawings, Figure 1 is a longitudinal section of a portion of a pipe with the damper, shown in perspective, attached thereto. Fig. 2 is a plan view of the spindle and ring at the juncture thereof. Fig. 3 is a section of the detail shown in Fig. 2.

The ring A of the damper consists of two parts, C and D, as in Fig. 1, the said parts being each provided with recesses E at diametrically-opposite points, and on each side of which recesses are other recesses, F. The spindles B, as shown in the drawings, are provided with side wings or flanges, G, which, when the said spindles are secured between the two parts of the ring, rest in the recesses F and prevent the spindles from turning in their seats. The outer ends of the spindles beyond the pipe, are formed into or provided with flat heads, which serve as a convenient means of manipulating the damper, one or both the said spindles being so formed. Plates I, having overhanging edge flanges and being also provided with legs K, cast on them, are secured on opposite sides of the ring by bolts or other suitable means, the said bolts or fastenings passing through the ends of the legs K, which are bent at an angle for the purpose, the bolts serving in the construction shown in Fig. 1 to also fasten together the two parts of the ring.

In order to make two legs securely and firmly support the plate on which they are formed, they are arranged diametrically opposite, and on the plate are cast lugs L, which are either formed long enough to rest on the ring or to rest on the ends of lugs M, cast on the ring, as shown in the drawings.

It is evident from the drawings that the plates I, being substantially dish shape and of a size preferably larger than the opening in the ring, will greatly retard the current passing through the pipe when the damper is in the position shown in the drawings, but will offer but little resistance when turned to a position at right angles thereto.

It is also evident that the parts being so formed as to be readily cast, the construction of the damper is cheapened and the number of pieces lessened, while the advantages of the form of damper are retained.

I do not limit myself to the exact construction shown and described, as the same may be varied without departing from the spirit of my invention.

Having thus described my invention, what I claim is—

A damper consisting of a ring formed of two parts having diametrically-opposite recesses, plates on opposite sides of the ring, and spindles or trunnions having wings or flanges thereon engaging in the recesses in the rings, substantially as and for the purpose specified.

In testimony whereof I affix my signature in presence of two witnesses.

RICHARD M. HERMANCE.

Witnesses:
JAMES H. WEEKS,
BENJ. M. FOWLER.